United States Patent [19]

Iwasawa

[11] Patent Number: 4,523,239
[45] Date of Patent: Jun. 11, 1985

[54] TAPE RECORDER HAVING AN ALARM AND STOP MECHANISM FOR END-OF-TAPE CONDITIONS

[75] Inventor: Teruo Iwasawa, Tokyo, Japan

[73] Assignee: Olympus Optical Co., Ltd., Tokyo, Japan

[21] Appl. No.: 509,098

[22] Filed: Jun. 29, 1983

Related U.S. Application Data

[63] Continuation-in-part of Ser. No. 295,328, Aug. 24, 1981, abandoned, which is a continuation of Ser. No. 116,753, Jan. 30, 1980, abandoned, which is a continuation of Ser. No. 924,807, Jul. 14, 1978, abandoned.

[30] Foreign Application Priority Data

Jul. 16, 1977 [JP] Japan .................................. 52-85349

[51] Int. Cl.³ ............................................. G11B 15/22
[52] U.S. Cl. ..................................... 360/74.1; 340/675
[58] Field of Search ........................ 360/74, 74.1–74.7; 340/259, 675

[56] References Cited

U.S. PATENT DOCUMENTS 3,694,585 9/1972 Goldner ............................. 360/74.7
4,157,575 6/1979 Satoh .................................. 340/675

Primary Examiner—George G. Stellar
Attorney, Agent, or Firm—Toren, McGeady, Stanger, Goldberg & Kiel

[57] ABSTRACT

A tape recorder includes a stop mechanism for automatically stopping tape running when a tape in a magnetic tape cassette reaches a final end. A final end alarm generating mechanism for detecting the tape at the final end generates an alarm sound. A switch is provided selectively switching the final end alarm generating mechanism and the automatic stop mechanism.

5 Claims, 4 Drawing Figures

TAPE RECORDER HAVING AN ALARM AND STOP MECHANISM FOR END-OF-TAPE CONDITIONS

This is a continuation-in-part of application Ser. No. 295,328, filed Aug. 24, 1981, now abandoned, which is a continuation of application Ser. No. 116,753, filed Jan. 30, 1980, now abandoned, which is a continuation of application, Ser. No. 924,807, filed July 14, 1978, now abandoned.

BACKGROUND OF THE INVENTION

1. Field of the Invention

The present invention relates to an arrangement for the running of a tape, and further relates to a tape recorder usable by allowing the selection of either the stopping action of a function under an operational condition or the provision of alarm of the stop condition, if necessary.

2. Description of the Prior Art

In conventional tape recoders, one type is provided with an automatic shut-off function for detecting the state when a tape reaches a final end, for then stopping running of the tape, and then restoring all the functions to the original condition. The other type is provided with a so-called ending alarm function for detecting the state when a tape reaches a final end and providing information relating thereto.

These tape recorders, however, generate a substantial sound when a tape reaches a final end, so that if the recording is carried out in a comparatively quiet place, the surroundings of that place are disturbed whenever the tape reaches the final end.

Therefore, it is strongly desired to construct a tape recorder by detecting the state when the tape reaches the final end and selecting and providing an informing sound generated on the basis of this state, if necessary.

SUMMARY OF THE INVENTION

An object of the present invention is to provide a solution to the above problem.

Another object of the present invention is to provide a tape recorder, in which the state of a tape arriving at a final end is detected and an operation after detection is by predetermination selected, so as to optionally select the generation of an informing sound without providing any special circuit.

According to the present invention, a tape recorder comprising: an audio amplifier and speaker for producing low frequency sound; means having an output coupled to said amplifier for providing a low frequency audio signal upon application of electrical power; end of tape detecting means for directing an end of tape condition; switch means responsive to said end of tape detecting means for supplying electrical power to said low frequency audio signal means upon detection of an end of tape condition by said end of tape detecting means, said low frequency audio signal means thereby providing a signal to said amplifier so as to provide a low frequency sound alarm from said speaker to indicate an end of tape condition; means responsive to said end of tape detecting means for supplying electrical energy to a tape driving motor prior to an end of tape condition and for supplying no electrical energy to said motor following detection of an end of tape condition by said end of tape detecting means; and manual changeover means for allowing said switch means to supply electrical power to said low frequency signal means after an end of tape condition in an alarm mode and for preventing said switch means from supplying electrical power to said low frequency signal means in a non-alarm mode.

DESCRIPTION OF THE PREFERRED EMBODIMENT

Figure 1:
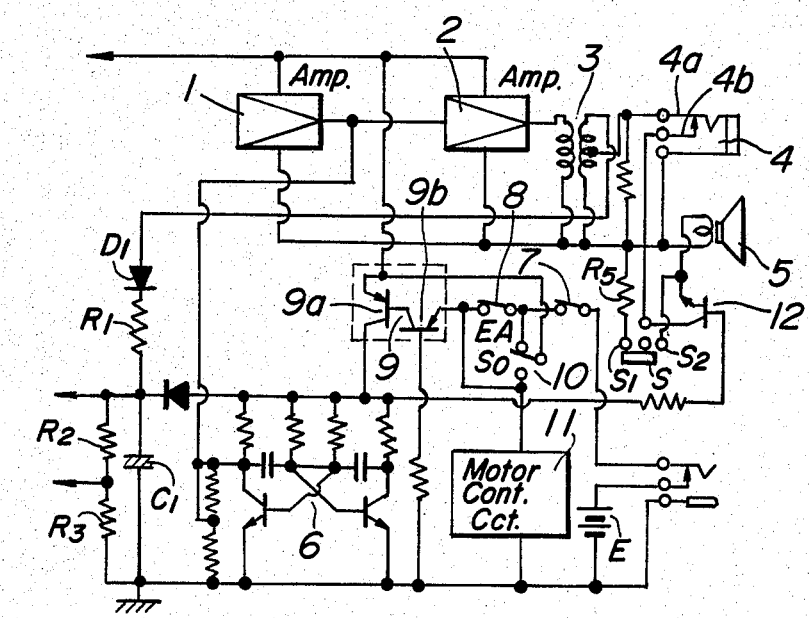
FIG. 1 is circuit diagram showing one embodiment of a tape recorder according to the invention.

Referring now to FIG. 1, one embodiment of a tape recorder according to the present invention will be described.

A sound signal is supplied to a preamplifier 1 from an inner or outer microphone (not shown) through an AGC circuit. This preamplifier 1 is connected to an earphone jack 4 through a recording and reproducing amplifier 2 and a transformer 3 or the like. An output end of the amplifier 2 is further connected to the AGC circuit for applying an output signal through a voltage supply circuit consisting of a diode $D_1$, resistances $R_1$, $R_2$, $R_3$ and a capacitor $C_1$ as an input source of a recording head (not shown). Further, a fixed contact $4b$ contacting a movable contact $4a$ of the earphone jack 4 is connected to a ground line through a recording contact $S_1$ of a recording-reproducing switch S and a resistance $R_5$. In addition, a reproducing terminal $S_2$ of the switch S is connected to a speaker 5.

For the thus constructed audio amplification circuit, a final end alarm generating circuit 6 is composed of a flip-flop circuit. To this circuit 6, is supplied an operational voltage from a power source E through a power source switch 7, a tape final end detecting switch 8 and a transistor switch 9 which will be explained below.

The tape final end detecting switch 8 is of a constantly closed type switch which detects the time when a tape reaches a final end and opens.

The transistor switch 9 consists of two transistors $9a$, $9b$, stops current flow through an emitter of the first transistor $9a$ at the time of ending the tape, connects to an alarm contact EA of a switch 10 of for selectively switching alarm generation or motor off, connects a collector to the final end alarm generating circuit 6 and further connects its base to a collector of the second transistor $9b$.

The emitter of the second transistor $9b$ is connected to one end of the switch 8, is opened when the tape is at the final end and is further connected to a motor control circuit 11 through a motor off side contact SO of the switch 10.

The output of the final end alarm generating circuit 6 is applied to the amplifier 2 and further applied to the base of a switching transistor 12 for generating a sound from the speaker 5.

In the thus constructed tape recorder, in order to generate an alarm when the running tape reaches the final end during recording, the contact EA, and as a result, a final end alarm (end alarm) is generated from the speaker 5 when the tape reaches the final end.

When the contact of the selective switch 10 is switched to the alarm side contact EA, the power source E is supplied to the motor control circuit 11 through the switch 7 and the switch 8 is opened at the time of the final end and further supplied to the first transistor 10. In this case, the first transistor 9a is in the inactive state since the second transistor 9b is on, the transistor switch 9 is in the off state, so that the power source E is supplied to the final end alarm generating circuit 6 and becomes inactive.

When the tape reaches the final end, the switch 8 detects it and opens its contact, so that the power supply to the motor control circuit 11 is stopped and the second transistor 9b of the transistor switch 9 becomes off and the first transistor 9a becomes on.

As a result, the final end alarm generating circuit 6 is actuated, an alarm signal having a certain oscillating frequency is generated, and an alarm sound is generated from the speaker 5 through the earphone jack 4 and the switching transistor 12 or the like by means of the amplifier 2.

When the switch 10 is thus switched to the alarm side, the tape final end is detected, the motor is stopped, an alarm sound is generated and the condition of the final end of the tape is provided. Even if the tape reaches the final end, rotation of the motor is stopped some times, but an alarm sound is generated (so-called silent off).

If the final end of the tape is detected without generating any alarm sound and the motor is stopped, if the switch 10 is switched to the motor off side contact SO, the tape reaches the final end as described above, the detecting switch 8 is opened, the supply of the power source E to the motor control circuit 11 is cut off, and the supply of the power source E to the transistor switch 9 is stopped. Therefore, the motor is stopped and the tape final end alarm generating circuit 6 is inactive, so that no alarm sound is generated.

When the transistor switch and the switch are thus used in combination, a step after detecting the final end of the tape can be carried out by a simple operation such as switching, and the usable condition of a tape recorder can be selected in a wide range.

Figure 2:
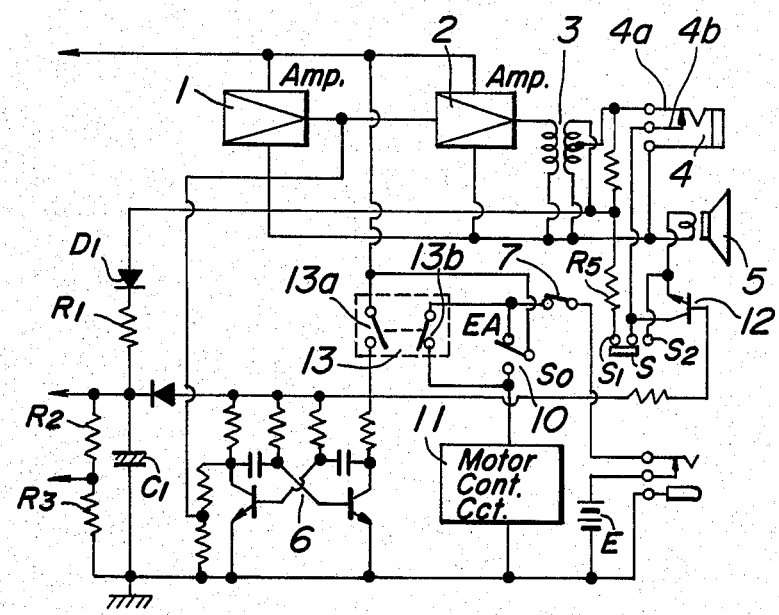
FIG. 2 is a circuit diagram showing another embodiment of the tape recorder according to the invention.

FIG. 2 shows another embodiment of the invention. The portion different from the above embodiment is that, instead of the transistor switch 9, a switch 13 actuated when the tape is at the final end is used as a contact switch of the circuit 2, one switch 13a is used for the final end alarm generating circuit 6, and the other switch 13b is used for the motor control circuit 11.

Figure 3:
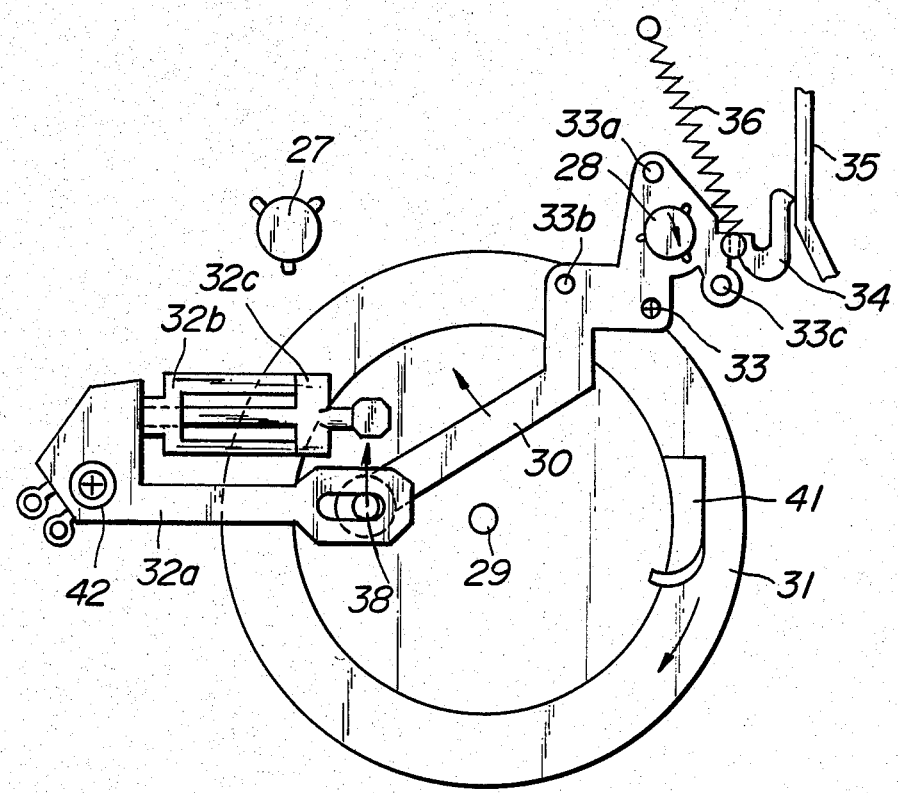
FIG. 3 is a plan view showing a drive mechanism of the device for use in a tape recorder according to the present invention.

FIG. 3 illustrates a drive mechanism of the tape recorder. Here, a reel or tape take-up shaft 27 and a reel supply or feed 28 are driven by power transmitted from a capstan 29 through, for instance, a belt or the like. The tape take-up shaft 27 is held not to displace axially, while the tape supply or feed shaft 28 is secured to one end of a swingable tape end sensing lever 30.

The tape end sensing lever 30 is rotatably supported by a shaft 33 for rotating the tape supply shaft 28 at one end and an end sensing switch 32 on a flywheel 31 at the other end as described above. The end sensing switch 32 corresponds to the tape final end detecting switch 8.

The sensing lever 30 forms a wide securing portion for the tape shaft 28. This wide portion is provided with projections 33a, 33b and 33c towards a substrate (not shown) for positioning the supply shaft 28 substantially at its center and a misoperation preventing member 34 projects integerally from the wide projection of the lever 30.

The misoperation preventing member 34 comes into contact with an operation lever 35 integrally provided on a recording operation button (not shown) at the stop position of the button. The member 34 and lever 35 are separated by a predetermined interval at the recording oposition.

A spring 36 between the base portion and the substrate of the misoperation preventing member 34 serves for rotating and biasing the sensing lever 30 counterclockwise.

Figure 4:
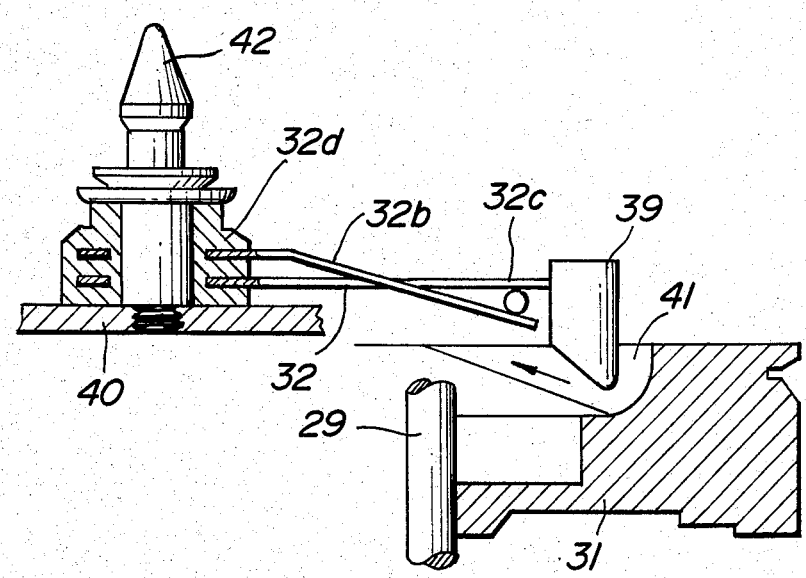
FIG. 4 is a partial and sectional view showing a detailed portion of the drive mechanism shown in FIG. 3.

On the other hand, the end sensing switch 32 is integral with an interlocking member 32a interlocked with the sensing lever 30. The switch 32 is composed of a contact member 32b forming a U-shape with and parallel to the member 32a and an operation member 32c for switching by opening to the contact member 32b. These members are integrally fixed to an insulating cylindrical member 32d. The end of the interlocking member 32a of the sensing switch 32 supported by the insulating cylindrical member 32d carries a guide member 37 having an elongate hole 32a of a predetermined length and formed with insulating material therein. The elongate hole 37a engages a coupling pin 38 provided at the other end of the tape end sensing lever 30. At the end of the operation member 32c opposite the contact member 32b of the sensing switch 32, a slidable member 39 composed of insulating material is slightly separated from the inner surface of the flywheel 31 as shown in FIG. 4.

The sensing switch 32 is rotatably secured to a substrate or panel 40 by means of a cassette guide pin 42 that projects into the cassette receiving portion of the tape recoder.

Around the inner peripheral surface of the flywheel 31 is provided a recess portion 41 for operating the slidable member 39. The recess portion 41 has an inclined surface for raising the slidable member 39 as the flywheel 31 is rotated and makes the operation member 32c open the contact member 32b.

The thus constructed tape recorder can generate an alarm sound or the like for informing the tape end to a user when a magnetic tape is finished in a supply side reel of the cassette during recording.

With the above construction, consumption of electric power is reduced than in the case of the transistor switch.

As described above in detail, the invention is to detect the time when the tape reaches the final end, to stop the motor and to generate an alarm, and further provide a tape recorder having simple construction and easy operability, which can also select a step of not generating any alarm sound, in necessary.

What is claimed is:

1. In a tape recorder having a final end alarm mechanism for producing an alarm sound when a tape reaches a final end and an automatic stop mechanism for stopping said tape, the improvement comprising a selective switch for selectively switching between a first and second condition, said first condition permitting the operation of the final end alarm mechanism and a second condition preventing the operation of said final end alarm mechanism, both conditions also permitting the normal operation of the automatic stop mechanism, said selective switch including:

a first switch for indicating an end of tape condition;

a second switch coupled to said first switch and including a pair of semiconductor elements for controlling power supplied to the alarm mechanism and automatic stop mechanism; and a third switch in connection with said first and second switches for making the selection between said first and second condition; and; including a motor control circuit wherein said first switch is a normally closed switch and having a power source applied at one end, said third switch having an arm, an alarm contact and a motor off contact, said second switch including a first and second transistor, said first transistor stopping current through its emitter at the time of ending of the tape, having its emitter connected to the arm of said third switch, having its collector connected to the final end alarm mechanism and having its base connected to a collector of the second transistor; said second transistor having its emitter connected to one end of said first switch and to said motor off contact and being coupled to a motor control circuit with said recorder so that when said third switch has its arm connected to its alarm contact and when the first switch opens, power supplied to the motor control circuit will stop and power will be supplied through the second switch to the alarm, and when said third switch has its arm connected to its motor off contact and when the first switch opens, power supplied to the motor will stop and the second switch will prevent supply of power to the alarm.

2. The arrangement of claim 1, wherein said recorder includes a motor and wherein the motor comes to a stop simultaneously with a tape arriving at its final end in both of said conditions.

3. The arrangement of claim 2, including an end of tape detecting means, said first switch being normally a closed switch and forming a part thereof.

4. The arrangement of claim 3, wherein said end of tape detecting means includes a take-up shaft, a tape supply shaft and a tape end sensing lever, said lever being rotatably supported by a shaft for rotating the take-up supply shaft at one end and said first switch at the other end.

5. The arrangement of claim 4, also including a misoperation preventing number.

* * * * *